(12) United States Patent
Feyereisen et al.

(10) Patent No.: US 7,098,809 B2
(45) Date of Patent: Aug. 29, 2006

(54) DISPLAY METHODOLOGY FOR ENCODING SIMULTANEOUS ABSOLUTE AND RELATIVE ALTITUDE TERRAIN DATA

(75) Inventors: Thea L. Feyereisen, Hudson, WI (US); Christopher J. Misiak, St. Paul, MN (US)

(73) Assignee: Honeywell International, Inc., Morristown, NJ (US)

( * ) Notice: Subject to any disclaimer, the term of this patent is extended or adjusted under 35 U.S.C. 154(b) by 561 days.

(21) Appl. No.: 10/368,748

(22) Filed: Feb. 18, 2003

(65) Prior Publication Data

US 2004/0160341 A1 Aug. 19, 2004

(51) Int. Cl.
*G08B 23/00* (2006.01)

(52) U.S. Cl. ............... 340/963; 340/967; 340/970; 342/29

(58) Field of Classification Search ........ 340/963, 340/967, 970, 973, 977, 978, 979; 701/207, 701/213, 219, 301; 342/26 B, 29, 176, 179, 342/197, 41; 345/427; 348/116
See application file for complete search history.

(56) References Cited

U.S. PATENT DOCUMENTS

| 5,745,863 | A | | 4/1998 | Uhlenhop et al. |
| 5,781,146 | A | * | 7/1998 | Frederick ............... 342/26 B |
| 5,936,552 | A | | 8/1999 | Wichgers et al. |
| 6,092,009 | A | | 7/2000 | Glover |
| 6,201,482 | B1 | * | 3/2001 | Schiefele et al. ......... 340/963 |

* cited by examiner

*Primary Examiner*—Toan N. Pham
(74) *Attorney, Agent, or Firm*—Fogg and Associates LLC; David N. Fogg

(57) ABSTRACT

A display control device, having a processor structured for receiving terrain elevation information and samples of current position and altitude above ground data; and one or more algorithms resident on the processor for generating, as a function of the current position and altitude above ground data, one or more display control signals for causing a display device to display, in a monochromatic scale graduated as a function of terrain elevation relative to mean sea level, a strategic portion of the terrain elevation information extending between a minimum elevation of the strategic portion of the terrain elevation information and a preselected strategic altitude threshold less than the altitude above ground data.

40 Claims, 4 Drawing Sheets

DISPLAY METHODOLOGY FOR ENCODING SIMULTANEOUS ABSOLUTE AND RELATIVE ALTITUDE TERRAIN DATA

This application claims the benefit of U.S. Provisional Application Ser. No. 60/445,302, filed in the names of Thea L. Feyereisen, and Christopher J. Misiak on Feb. 4, 2003, the complete disclosure of which is incorporated herein by reference.

FIELD OF THE INVENTION

The present invention relates generally to apparatus and methods for displaying terrain data; and in particular to displaying relative altitude terrain data in a strategic format.

BACKGROUND OF THE INVENTION

Visual display systems for providing an aircraft pilot terrain situational awareness and real-time, dynamic display of any terrain hazards are generally well-known. Typically, such displays show terrain and potential hazards formatted in either a horizontal terrain elevation view or a profile terrain elevation view relative to the host aircraft's position, altitude and heading.

FIG. 1 shows a known terrain situation awareness display 10 that illustrates by example on the upper portion a horizontal or plan terrain elevation view 12, also known as a "bird's eye" or map view, and on the lower portion a profile terrain elevation view 14, as described by Wichgers, et al. in U.S. Pat. No. 5,936,552, INTEGRATED HORIZONTAL AND PROFILE TERRAIN DISPLAY FORMAT FOR SITUATIONAL AWARENESS, which is incorporated herein by reference in its entirety. Both views are based on a display generated using a Jeppesen supplied database that covers a 300 by 270 mile area of terrain. Scale of the display 10 is indicated by numerals thereon. For example, when the scale of display is a total of 160 miles ahead of the aircraft (triangle icon 16) to the top of the screen, the numeral "80" is shown in the center of horizontal elevation view 12 to indicate the midpoint. The numerals "1," "80," and "160" similarly show the scale at the bottom of profile view 14. The display format scaling is selectable similar to weather radar display scale selections, or is continuously selectable.

The horizontal elevation view 12 uses a triangle icon 16 to indicate the host aircraft's current position. Current aircraft altitude 18 is depicted on the horizontal elevation view 12 as an altitude of 4200 feet above Mean Sea Level (MSL). Aircraft heading is indicated by the vertical dashed line 20 extending from triangle icon 16 to compass rose 22 and the selected aircraft heading is 357 degrees as indicated by the triangular heading bug 24 on the compass rose 22.

The horizontal elevation view 12 displays elevation data for the region around the aircraft, the terrain elevation data is supplied by a database as a function of aircraft position. Terrain elevations are displayed relative to the aircraft, rather than absolute elevations. Terrain elevations higher than a pre-selected "comfort zone" below the current aircraft altitude are depicted by illuminating corresponding pixels of the display. See, for example, regions 26 of display 10. The display is monochromatic for terrain elevations below the pre-selected comfort zone.

The profile situational awareness display portion 14 of the display 10 indicates the aircraft present position using triangle symbol 28. Horizontal dashed line 30 represents current aircraft altitude and is useful for determining terrain clearance. Terrain profile 32 depicts the vertical terrain elevation profile of the path directly in front of the aircraft as supplied by the database of terrain elevation data as a function of aircraft position. The terrain profile 32 of the profile display 14 depicts a section view or "slice" of terrain elevation information taken along the aircraft heading, as indicated by vertical dashed line 20 of the horizontal elevation view 12.

The display 10 is color coded (colors not shown) according to terrain elevations relative to the aircraft. For example, the colors red, yellow, and green are used to indicate warning, caution, and all clear, respectively. Accordingly, horizontal elevation view 12 are shown using the color red (not shown), indicating warning, to display all terrain elevations which are higher than the host aircraft's current altitude.

The same color scheme (not shown) is used in profile view 14 to display all portions of the flight profile 32 which are higher than the current altitude as indicated by dashed line 30.

The color yellow (not shown), indicating caution, is used to display terrain that is below the aircraft's current altitude but higher than the selected comfort zone. Those portions of horizontal elevation view 12 and profile view 14 are accordingly displayed in yellow.

The color green (not shown), indicating "all clear," is used to display terrain below the selected comfort zone and is not currently a hazard to the aircraft. Blue (not shown) is used to display large bodies of water. Other colors or symbology are utilized to indicate other database information on the display, such as restricted airspace and airport locations.

By providing detailed data only for terrain elevations above the selected comfort zone, such systems fail to supply information about terrain that is not at present a potential threat. Except for color coding large bodies of water and specific database information, such as restricted airspace and airport locations, details are eliminated below the selected comfort zone elevation, and the terrain is painted a single safe or "all clear" color. Known terrain situational awareness display systems are thus limited to displaying only tactical information to which the pilot must react in the short term.

SUMMARY OF THE INVENTION

The present invention overcomes the limitations of prior art terrain awareness displays and systems by providing method for dynamically displaying terrain situation awareness information. The method of the invention is embodied, by example and without limitation, in a display control device, having: a processor structured for receiving terrain elevation information and samples of current position and altitude above ground data; and one or more algorithms resident on the processor for generating, as a function of the current position and altitude above ground data, one or more display control signals for causing a display device to display, in a monochromatic scale graduated as a function of terrain elevation relative to mean sea level, a strategic portion of the terrain elevation information extending between a minimum elevation of the strategic portion of the terrain elevation information and a pre-selected strategic altitude threshold less than the altitude above ground data.

According to another aspect of the invention, the processor of the display control device is further structured for receiving samples of one or both of current heading data and current track data; and the one or more algorithms resident on the processor for generating one or more display control signals for causing a display device to display a strategic portion of the terrain elevation information are further operated for generating the one or more display control signals as a function of the current position, altitude above ground and one or both of heading and track data, where "heading" and "track" are defined according to common usage in aviation so that "heading" refers to a direction in which the nose of the aircraft is pointing, while "track" refers to a direction or "course" over the ground actually flown by the aircraft.

According to another aspect of the invention, the one or more algorithms resident on the processor for generating the one or more display control signals include one or more algorithms for continuously generating the one or more display control signals as a function of continuously updated current position and altitude above ground data.

According to another aspect of the invention, the one or more algorithms resident on the processor for generating the one or more display control signals include one or more algorithms for causing a display device to display a tactical portion of the terrain elevation information having an elevation greater than the pre-selected strategic altitude threshold in a format color coded as a function of terrain elevation relative to the current altitude above ground information.

According to another aspect of the invention, the one or more algorithms resident on the processor for causing a display device to display a tactical portion of the terrain elevation information in a format color coded as a function of terrain elevation relative to the current altitude above ground information further comprise one or more algorithms for causing a display device to display a portion of the tactical terrain elevation information having an elevation greater than the current altitude above ground in a format color coded in a relative altitude color selected to indicate warning.

According to yet another aspect of the invention, the one or more algorithms resident on the processor for causing a display device to display a tactical portion of the terrain elevation information in a format color coded as a function of terrain elevation relative to the current altitude above ground information further comprise one or more algorithms for causing a display device to display one or more of a safe portion of the tactical terrain elevation information having an elevation greater than the pre-selected strategic altitude threshold but less than the current altitude above ground in a format color coded in a relative altitude color selected to indicate safety, and a caution portion of the tactical terrain elevation information having an elevation greater than the safe portion of the tactical terrain elevation but less than the current altitude above ground in a format color coded in a relative altitude color selected to indicate caution.

According to still other aspects of the invention, the method of the invention is embodied, by example and without limitation, in a computer program residing on a computer usable storage medium, the computer program having executable computer-readable program code configured to cause a computer processor to operate the method of the invention for dynamically displaying terrain situational awareness information on a color graphics cockpit display, such as a Primary Flight Display (PFD) or another suitable cockpit display device.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements.

The present invention is an integrated display apparatus, method and computer program product for dynamically displaying terrain situation awareness information over a selected distance relative to an aircraft's current position and altitude by receiving at intervals one or more signals representative of current position, one or both of a current heading and a current track, altitude above ground data, and optionally current speed over ground and acceleration data; retrieving a plurality of terrain elevation data as a function of the position and one or both of the current heading and track data, where "heading" and "track" are defined according to common usage in aviation so that "heading" refers to a direction in which the nose of the aircraft is pointing, while "track" refers to a direction or "course" over the ground actually flown by the aircraft; and displaying a color coded representation of a strategic portion of the terrain elevation data having an elevation less than a pre-selected strategic altitude threshold determined relative to and less than the current altitude data, wherein displaying the color coded representation of strategic terrain elevation data includes color coding the representation as a monochromatic scale graduated as a function of terrain elevation relative to mean sea level.

According to one embodiment of the integrated display apparatus, method and computer program product of the invention dynamically displays terrain situation awareness information by displaying a color coded representation of a tactical portion of the terrain elevation data having an elevation greater than the pre-selected strategic altitude threshold. Displaying a color coded representation of a tactical portion of the terrain elevation data includes color coding the representation the tactical portion of the terrain elevation data as a function of terrain elevation relative to the altitude above ground data.

According to one embodiment of the invention, color coding the representation the tactical portion of the terrain elevation data as a function of terrain elevation relative to the altitude above ground data includes color coding in different colors a safe portion of the tactical terrain elevation data having an elevation between the strategic altitude threshold and a pre-selected caution elevation below the altitude above ground data, a caution portion of the tactical terrain elevation data having an elevation between the caution elevation and the altitude above ground data, and a warning portion of the tactical terrain elevation data having an elevation greater than the altitude above ground data.

Figure 1:
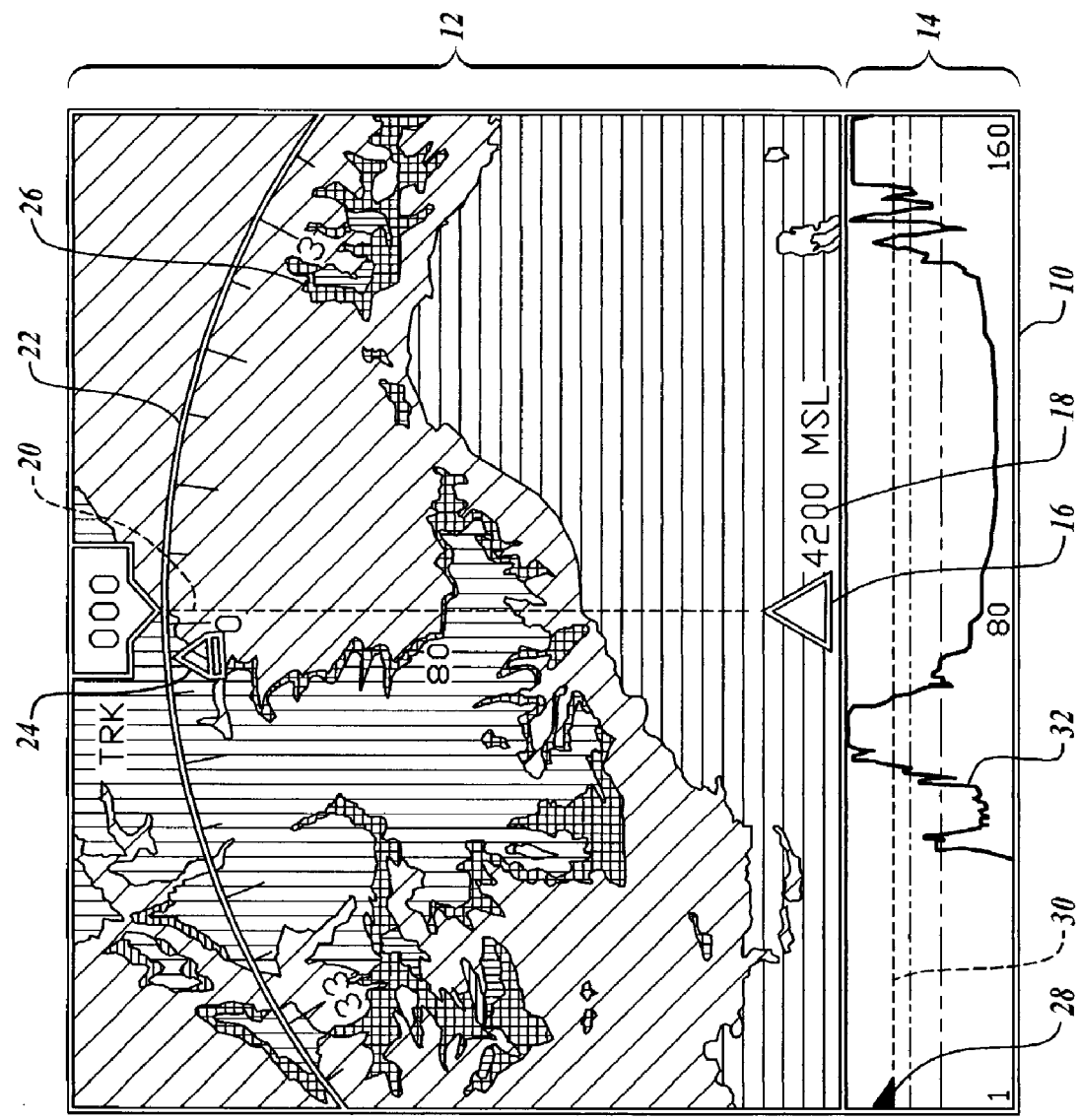
FIG. 1 shows a terrain situation awareness display of the prior art that illustrates by example a horizontal or plan terrain elevation view and a profile terrain elevation view.
Figure 2:
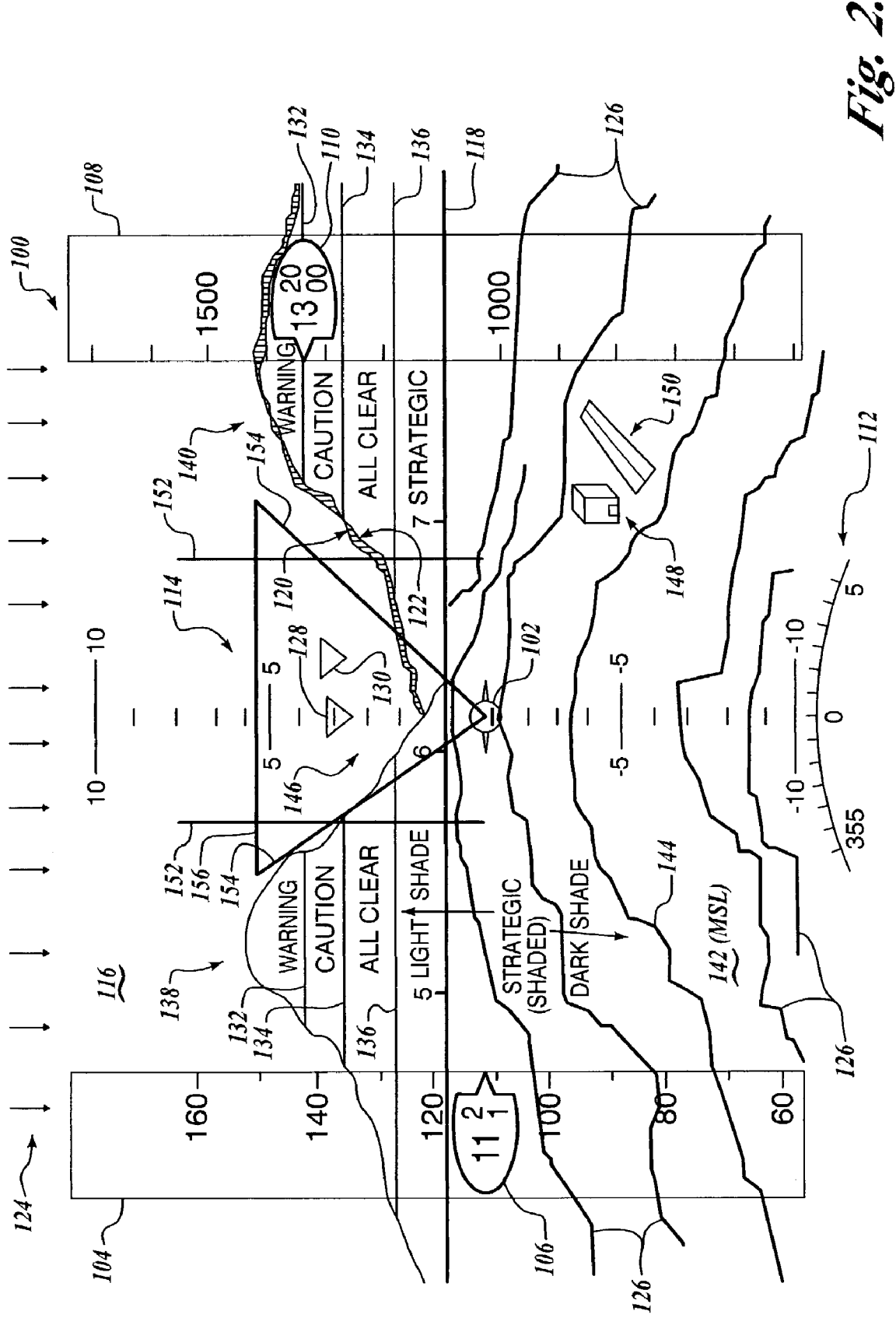
FIG. 2 illustrates, by example and without limitation, the method of the invention for dynamically displaying terrain situation awareness information over a selected distance relative to an aircraft's current position and altitude as embodied in a terrain situation awareness display presented on a graphical cockpit display apparatus in a wide-angle, look-ahead conformal view.

FIG. 2 illustrates, by example and without limitation, the method of the invention for dynamically displaying terrain situational awareness information over a selected distance relative to an aircraft's current position and altitude as embodied in a terrain situational awareness display presented on a cockpit display apparatus 100 using a wide-angle, look-ahead perspective or conformal view. The display apparatus 100 is a graphical cockpit display embodied, for example, as a Primary Flight Display (P FD). A suitable head-down PFD is the Honeywell DU-1080 Display Unit, which is a color active matrix liquid crystal display (LCD) based device 10.4" diagonal in size that is available from Honeywell International, Inc. of Morristown, N.J. Alternatively, the terrain situational awareness display presentation of the invention is displayed on a Head-Up Display (HUD) that is, for example, the HUD2020 also available from Honeywell International, Inc. Many other conventional cockpit displays are also suitable for practicing the integrated display and integrated display presentation of the invention, the Honeywell DU-1080 Display Unit and HUD2020 unit being only examples used to demonstrate the invention and not intended in any way to limit the scope of the invention.

In the display 100 of FIG. 2 an aircraft icon 102 represents a host aircraft having the terrain situational awareness apparatus of the invention installed thereon. Several indicators provide information useful to the pilot. The indicators displayed include, by example and without limitation, an indicated air speed indicator 104 configured by example as a scale or tape includes a pointer 106 showing the current indicated air speed, and an altitude indicator 108 configured by example as a scale or tape and having a pointer 110 showing the current aircraft altitude. A conventional heading pointer on a compass rose 112 may be provided and may be supplemented by a digital readout of heading angle (not shown). A conventional pitch scale 114 may also be displayed. Other useful indicators are described more completely in co-pending patent application Ser. No. 10/252,029 entitled INTERFACE FOR VISUAL CUEING AND CONTROL FOR TACTICAL FLIGHTPATH MANAGEMENT, filed on Sep. 20, 2002, which is assigned to the assignee of the present patent application and is incorporated herein by reference in its entirety.

An ability of the pilot to perceive spatial relationships is understood to be critical to situation awareness and to the ultimate safety of flight. Spatial flow is a graphical presentation technique that replicates the spatial motion and energy cues available in visual flying. During visual flight, pilots perceive movement and distance by combining evidence about texture, perspective, and color changes. These same immergent features: texture, perspective, and color, are recreated and integrated in the cockpit display 100 by the terrain situation awareness display presentation of the invention being operated by automation onboard the host aircraft. The spatial flow symbology elements provided on the cockpit display 100 by the terrain situation awareness display presentation of the invention include a wide-angle field of view (FOV). The wide angle FOV is, for example, about 45 degrees or +/−22½ degrees in the lateral by about 33⅓ degrees or +/−16⅔ degrees in the vertical.

The spatial flow symbology elements provided by the terrain situation awareness display presentation of the invention also include color shading of sky 116 portion of the display 100 in shades of blue (color not shown). Color gradations may be displayed in the sky portion 116 as shading decreasing toward the top of the display to replicate color gradations in the sky on a clear blue day and thereby facilitate pre-attentive processing for depth perception, as well as indications for unusual attitude recovery.

An artificial horizon 118 assists depth perception.

Outside relationships are replicated on the cockpit display 100 via conformal symbology, whereby terrain and navigation information is integrated and positioned on the display 100 to appear in positions consistent with a wide-angle, look-ahead view as seen from the cockpit. Conformal symbology is rendered either using true one-to-one mapping, or using conformal compressed symbology whereby information on the display is maximized. The invention thereby presents visual cues in a "real world" context while flying Instrument Flight Rules (IFR) on a Primary Flight Display (PFD), similar to that experienced flying Visual Flight Rules (VFR). Presentation of conformal symbology on the cockpit display 100 improves overall situation awareness. Conformal symbology permits the pilot to utilize pre-attentive referencing, which is a recognition driven process that reduces pilot workload, rather than requiring conscious decision. Tracking performance has been shown to improve when conformal symbology is used to present navigation information.

According to the embodiment of the invention illustrated in FIG. 2, conformal symbology elements include without limitation terrain situational awareness information over a selected distance relative to an aircraft's current position and altitude. According to one embodiment of the invention, the terrain situation awareness information is presented for a depth of field or "range" of about 100 nautical miles along the aircraft's current path; at a range of about 15 nautical miles an artificial haze 120 begins to obscure terrain information 122 by limiting detail and reducing resolution, and the information is completely obscured beyond the 100 nautical mile range. The artificial haze 120 and complete obscurity at the selected range aids depth perception, while the complete obscurity also helps to limit the amount of information the pilot must process. The haze and obscurity ranges are selectable and other embodiments may increase or decrease either range, while the artificial haze may be completely eliminated.

Artificial lighting is used to render the displayed information. The artificial lighting helps to show contour in the terrain 122 and causes the displayed terrain information to appear more like the "real world." The terrain 122 is, for example, rendered to appear as if illuminated by an artificial light source, such as the overhead or "top-down" lighting represented by the arrows 124. The artificial lighting is provided using conventional graphics rendering techniques. For example, the well-known open GL programming language or protocol for rendering graphics includes lighting source information and a repertoire of techniques surrounding the lighting source information.

The conformal symbology elements may also include topographical relief information illustrated as grid lines 126 following the terrain contour, which, if present, are displayed using a lighter shade of the color used to represent the contoured portion of terrain. For example, the grid lines 126 are painted at about 80 percent transparency and spaced about 180 meters apart with a North-South orientation.

The conformal symbology elements may also include conventional lateral current and next waypoint symbols 128, 130.

The terrain situation awareness information presentation of the invention as embodied in the conformal symbology of the integrated display 100 reduces pilot workload, particularly close to the ground, by removing ambiguity of objects in the far domain, i.e., the external world, that exist in instrument conditions by presenting those objects in the near domain, i.e., the display 100, in positions consistent with a view as seen on from the cockpit. Displaying the terrain situation awareness information of the invention using conformal display symbology further aids pilots in the transition from near domain to far domain by presenting the terrain information using symbology that mimics the form of the terrain objects as they appear in the far domain.

The terrain situational awareness information of the invention is displayed over the selected distance relative to the host aircraft's current position and altitude.

Tactical terrain is terrain having an elevation greater than a pre-selected threshold altitude determined as a function of the current aircraft altitude Above Ground Level (AGL), in other words, above terrain. This is terrain which may give rise to any "warning," "caution," or "all clear" signal. Tactical terrain information is coded as a function of terrain elevation relative to the current aircraft altitude above terrain or AGL.

According to one embodiment of the invention, the tactical information includes all terrain within the selected range and FOV of the aircraft that has an elevation above the pre-selected threshold altitude relative to the current aircraft altitude AGL. Terrain having an elevation at or above the aircraft's current altitude is in the "warning" range, and the terrain in the display 100 is illuminated or "painted" using a relative altitude color selected to indicate warning. Terrain that is at or above the aircraft's current altitude, as indicated by the horizontal line 132, is thus painted a warning color, such as red.

Terrain having an elevation below the current altitude of the aircraft but above a pre-selected "caution" threshold altitude relative to the aircraft's current altitude, as indicated by the horizontal line 134, is painted using a relative altitude color selected to indicate caution, such as yellow. The "caution" threshold altitude is, for example, pre-selected to be about 1,000 feet below the aircraft's current altitude.

Terrain having an elevation below the pre-selected "caution" threshold altitude relative to the aircraft's current altitude but above a pre-selected "all clear" or strategic threshold altitude, as indicated by the horizontal line 136, is painted using a relative altitude color selected to indicate "all clear" or safety, such as green. The "all clear" or strategic threshold altitude is, for example, pre-selected to be about 2,000 feet below the aircraft's current altitude.

The tactical terrain information is superimposed over monochromatic strategic terrain information, which is color coded in a graduated scale of a relative altitude color selected to indicate neutrality.

Strategic terrain is terrain having an elevation relative to the current aircraft altitude that is less than the selected strategic threshold altitude. Strategic terrain is thus so far beneath the aircraft's current altitude that it is too low to be characterized in conventional terrain situational awareness display systems which are limited to displaying only tactical information that may present a potential threat to which the pilot must react in the short term.

According to one embodiment of the invention, strategic terrain information is coded as a monochromatic scale that is graduated as a function of terrain elevation relative to mean sea level. For example, the strategic terrain is coded from a dark shade of a neutral color, such as brown, for the lowest elevation to a light shade of the same color for the highest elevation, i.e., at the selected strategic threshold altitude indicated by horizontal line 136. According to one embodiment of the invention, the strategic terrain information is graded from the darkest shade to the lightest shade over the minimum to maximum elevation of the terrain data for the current displayed range of data, or alternatively the range of the current terrain database file.

In the example illustrated in FIG. 2, the path of the host aircraft is between two mountains 138, 140. The first mountain 138 is within 15 nautical miles of the aircraft's current position and is shown clearly defined, while the second mountain 140 is within the 100 nautical mile obscurity range but beyond the 15 nautical mile haze range so that the artificial haze 120 begins to obscure the terrain information 122 that represents the mountain 140. The aircraft is currently over a large body of water 142 at sea level so the terrain situational awareness information is coded an appropriate color, such as dark blue, to indicate Mean Sea Level (MSL). The terrain increases from MSL at the shoreline 144 to the mountain peak elevation. The aircraft is currently flying at an altitude above the elevation of a pass 146 between the two mountains 138, 140, but below the elevations of mountain peaks. The aircraft is on a course between the mountain peaks 138, 140, as indicated by current and next waypoints 128, 130.

The display's wide-angle FOV is wide enough in the lateral to include the mountain peaks 138, 140 on either side of the pass 146, and is wide enough in the vertical to include the sea 142 beneath and the sky 116 over the mountain peaks 138, 140.

The terrain information of the mountain peaks 138, 140 is coded using the tactical terrain situational awareness coding described herein. The warning elevation line 132 on the mountain peaks 138, 140 is the same as the aircraft's current altitude AGL. Terrain at or above the elevation line 132 is therefore painted the selected relative altitude warning color, e.g., red. The elevation line 132 also marks the top of a pre-selected caution elevation band. The caution elevation line 134 marks the "caution" threshold altitude at the pre-selected distance below the aircraft's current altitude. The mountain terrain between the warning elevation line 132 and the bottom of the caution band at the caution elevation line 134 is painted the selected caution color, e.g., yellow. Terrain in the all clear or safety band below the caution elevation line 134 but above the strategic elevation line 136 is terrain below the selected caution elevation and is not currently a hazard to the aircraft, but still represents a potential threat. Terrain information within the all clear or safety band below the caution elevation line 134 but above the strategic elevation line 136 is painted the all clear or safety color, e.g., green.

Terrain in the lowlands above MSL at the sea shore 144 but below the minimum tactical elevation, which is represented by the strategic elevation line 136, is painted the selected color for strategic terrain, e.g., brown. However, unlike prior art terrain situational awareness display systems that are limited to displaying only tactical information, the strategic terrain information is coded as a function of the current aircraft altitude. The strategic terrain data is coded from lowest to highest elevation, with the lowest elevation being painted a darkest shade, the highest elevation below strategic elevation line 136 being painted a lightest shade, and different elevations in between being shaded on a graduated scale between the dark and light shades of the lowest and highest elevations. Shading within the monochromatic scale being graduated as a function of elevation above MSL.

As discussed above, large bodies of water are coded using a relative altitude color representative of water at MSL, and the terrain in the display 100 is illuminated or "painted" using a relative altitude color selected to indicate water at MSL. Terrain that is water at MSL, as indicated by the shore line 144, is thus painted a water color, such as blue, and according to one embodiment of the invention, the topography of the terrain below MSL is obscured.

According to another embodiment of the invention, the integrated display apparatus, method and computer program product of the invention is practiced for dynamically displaying terrain situation awareness information in a marine environment over a selected distance relative to a marine vessel's current position and altitude represented as current water or sea level, which optionally accounts for keel depth and elevational changes with phases of the tide using tide tables.

The database of terrain situation awareness information of the invention may also include hazard and other useful information 148, 150, such as obstacle data, towers (shown), airport locations (shown), docking locations, boundaries of restricted airspace, restricted elevations for particular airspace, and the like. Other colors or symbology may be utilized to indicate this hazard and other database information on the display.

Terrain information coding according to the intervention is dynamically updated as a function of the host aircraft's current altitude AGL. As such, terrain information is coded either tactical or strategic as a function of the aircraft's current altitude; the relative altitude color coding changing with decreasing and increasing altitude of the host aircraft. The warning, caution, all clear and strategic coding elevations or bands thus also change as the aircraft's altitude changes. Thus, as the aircraft ascends to enter the pass 146, warning, caution, and all clear color coding representations "climb" up the displayed terrain accordingly. Strategic color coding remains unchanged relative to the aircraft's changing altitude: it is fixed for the given area. This strategic color coding of the terrain elevation is revealed as the tactical representation "climbs" along with the aircraft. When the aircraft descends on approach, the warning, caution, and all clear elevations "descend" down the displayed terrain accordingly. The all clear and caution bands disappear in turn as the aircraft nears touchdown.

According to another embodiment of the invention, the tactical terrain in the display 100 is coded relative to flight path projection in combination with the current altitude above the terrain. For example, if the terrain is above the aircraft's current altitude but it is outside of either a pre-selected envelope represented by parallel lines 152 or angular lines 154 on either side of the aircraft heading or track 102 and for a pre-selected distance ahead represented by line 156 of the aircraft heading 102, the terrain is painted using the strategic coloring. Thus, when the flight path is not projected to go into an area, the terrain remains the strategic color, e.g. brown, and is not painted one of the tactical colors, e.g., green or yellow or red. Rather, terrain outside of the pre-selected envelope around the projected flight path is painted the strategic color.

The flight path is projected along the direction of the aircraft's programmed or intended route as supplied by a Flight Management System (FMS), as discussed herein. The pre-selected envelope represented by parallel lines 152 or angular lines 154 on either side of the aircraft 102 represents a volume of space surrounding the projected one of the aircraft heading and the aircraft track for a pre-selected distance from the updated position. The pre-selected envelope represented by parallel lines 152 represents a vertically extending rectangular-shaped volume of space surrounding the projected one of the aircraft heading and the aircraft track.

The pre-selected envelope represented by angular lines 154 is a vertically extending angular wedge-shaped volume of space surrounding the projected one of the aircraft heading and the aircraft track. The vertically extending angular wedge-shaped volume of space that forms the envelope includes a volume of space within an area swept by a vertical plane between pre-selected positive and negative azimuth angles relative to the projected one of the aircraft heading and the aircraft track and has an apex located by example and without limitation approximately at the at updated position.

The flight path is projected as a time function computation so that terrain is depicted according to the tactical colors of the invention for a pre-selected distance ahead of the aircraft 102, as represented by line 156. The distance is calculated as five minutes or another selected time window. Optionally, the time window is variable as a function of current air speed and may include a factor to account for current acceleration. Alternatively, the flight path is projected for a pre-selected distance that may be varied as a function of current air speed.

The predictive algorithm is further variable based upon the accuracy and resolution of terrain database, performance characteristics of aircraft, desired protection window, RNP (required navigation performance), and other factors. In essence, only terrain in front of the aircraft or in the direction of turn may give rise to any "warning," "caution," or "all clear" signal.

Figure 3:
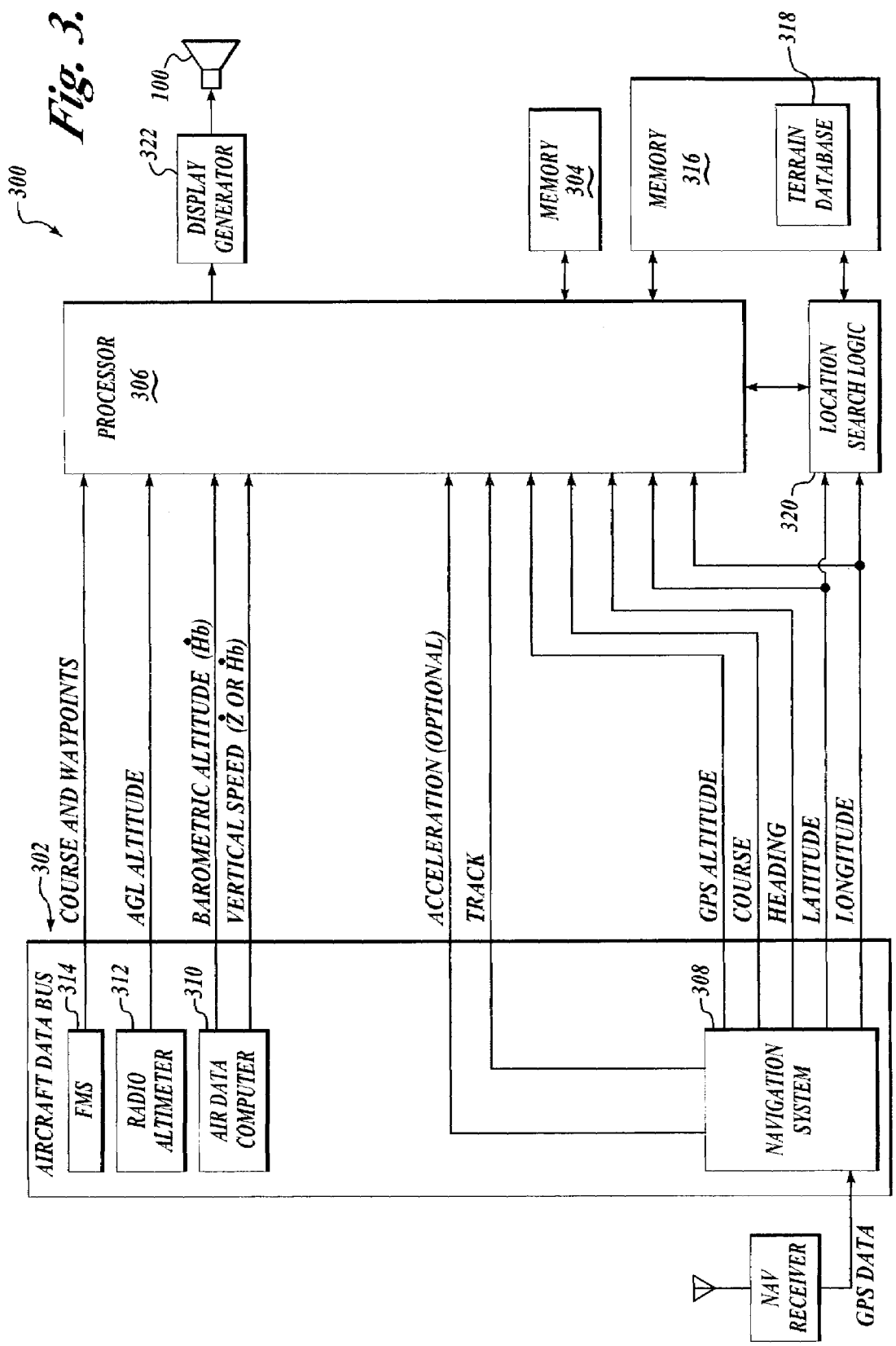
FIG. 3 illustrates by example and without limitation, an integrated display presentation system of the invention for dynamically displaying terrain situation awareness information in an aircraft environment embodied as a system block diagram.

FIG. 3 illustrates, by example and without limitation, an integrated display presentation system 300 of the invention for dynamically displaying terrain situation awareness information in an aircraft environment embodied as a system block diagram. Onboard automation is known for dynamically displaying terrain information as a function of aircraft position, the onboard automation including technology for determining accurate aircraft current position and flight path information, storing and retrieving surrounding terrain data from a digital terrain database as a function of the aircraft current position information, and processing terrain data.

The integrated display presentation of the invention is provided as a set of machine instructions received and operated by the onboard automation and presented on the integrated display 100. The machine instructions include instructions for receiving data from one or more of the instrument information signals available on either an aircraft data bus 302 or another suitable means for providing real-time electronic signal data source of instrument signals reporting flight parameter information provides the various signals to the integrated display presentation system 300 of the invention. A detailed description of the signals available on an aircraft data bus 302 is provided by the ARINC Characteristic 429 as published by Aeronautical Radio, Incorporated of Annapolis, Md., the entirety of which is incorporated herein by reference. Included among the signals provided by the aircraft data bus 302 or other suitable source are signals useful for operating the integrated terrain situation awareness display presentation system 300 of the invention, these signals including by example and without limitation: barometric and radio altitude signals; a vertical speed signal; and navigation signals, including GPS altitude, course; heading; latitude and longitude signals, track, and acceleration.

These signals are used as inputs to an integrated terrain situation awareness display presentation circuit, which in turn is effective to generate an integrated plurality of display control signals informing the terrain situation awareness display presentation of the invention. The integrated plurality of display control signals are applied to a display generator, that in turn generates a plurality of display control signals that result in the spatial flow symbology, conformal symbology, and terrain situation awareness information being displayed on the cockpit display 100.

A plurality of machine instructions are stored in an onboard memory 304, which are retrieved and operated by a computer processor 306 to generate the integrated display control signals for generating the integrated display presentation of the invention. The computer processor 306 is for example but without limitation a microprocessor, a digital signal processor, or another suitable processor and may be either a dedicated processor or a processor shared with other onboard equipment. The processor 306 includes inputs coupled to the onboard memory 304 to receive machine instructions and inputs coupled to the data bus 302 to receive sources of instrument signals reporting flight parameter information. The processor 306 uses data received from a navigation system 308 on the aircraft to provide current information about the altitude, course, heading, track, latitude and longitude and optionally acceleration of the aircraft. The navigation data may be obtained directly from the navigation system, which may include an inertial navigation system, a satellite navigation receiver such as a GPS receiver (shown), VLF/OMEGA, Loran C, VOR/DME or DME/DME, or from the Flight Management System (FMS).

Information about the pressure or barometric altitude relative to sea level, vertical speed, and current air speed of the aircraft are available from the navigation system 308, from an air data computer 310, or from a barometric altimeter and a barometric rate circuit present on the aircraft.

Current altitude relative to the ground, i.e, AGL altitude, is provided to the integrated terrain situational awareness display presentation circuit of the invention by signals from a radio altimeter 312 which is commonly a low powered radar that measures vertical distance between the aircraft and the ground. Radio altimeters are an essential part of many avionics systems and are widely used over mountainous regions to indicate terrain clearance. Also known are laser altimeters in which a laser beam modulated by radio frequencies is directed downward and reflected from the terrain. The reflection is gathered by a telescope system, sensed with a photomultiplier, and phase compared with the original signal. Optionally, GPS altitude data is used.

A Flight Management System (FMS) 314 coupled to the data bus 302 has stored therein information about the intended course during the current flight, including information about the positions of waypoints along the aircraft's flight path.

These signals available on the data bus 302 are applied to the processor 306 for enabling the integrated terrain situational awareness display presentation of the invention according to the different ones of the spatial flow symbology presentation, the conformal symbology presentation, and the terrain situational awareness information presentation operations performed by the integrated display presentation system 300 of the invention.

A memory device 316 coupled to the processor 306 stores a digital terrain database 318 as a function of position, such as latitude and longitude position data. The source of the digital terrain database 318 is, for example, a public United States Geographic Survey (USGS) having a resolution on the order of 3 arc-seconds or 90 meters, and includes topographical relief information useful for applying the grid lines 126 following the terrain contour. The terrain database may include not only the locations of natural terrain obstacles such as mountains or other high ground areas, but also man-made obstacles such as radio towers, buildings, and the like. The terrain database may also include the boundaries of restricted airspace, e.g., airspace around military installations, restricted elevations for particular airspace, airport locations, bodies of water and the like. Alternatively, the display generated using a Jeppesen supplied database that covers a 300 by 270 mile area of terrain and, optionally, includes topographical relief information. A location search logic device 320 is coupled between the memory device 316 and the processor 306 for accessing terrain database 318 during operation of the invention. Other suitable terrain databases are also known, such as the terrain database operated by Honeywell International's Enhanced Ground Proximity Warning System (EGPWS).

Using the data supplied by the different instrument information signals available on the data bus 302, the processor 306 operates one or more algorithms for generating the plurality of display control signals, as illustrated in FIG. 2 and described in detail below. The display control signals are output to a display generator 322 that interprets the display control signal to generate the terrain situation awareness symbology presented on the display 100.

The integrated display presentation system 300 as embodied in FIG. 3 includes a plurality of machine instructions stored in the onboard memory 304, which are retrieved and operated by a processor 306 to generate the simulated visual field of view (FOV) on the display 100, as shown in FIG. 2. The processor 306 receives an AGL altitude data signal from one of the altitude data signals sources on the data bus 302 to provide current information about the above ground altitude of the aircraft. The AGL altitude data are applied to the processor 306 for enabling the wide-angle FOV, including the artificial horizon 118.

An additional plurality of machine instructions stored in the onboard memory 304 are retrieved and operated by the processor 306 to retrieve real-time spatial position information available on the data bus 302, such as a position defined by latitude and longitude values. As a function of the real time aircraft position information, the processor 306 uses the location search logic circuit 320 to retrieve terrain information from the database of terrain information 318 stored in the memory device 316. The terrain information retrieved from the database 318 includes at least data relevant to the terrain to the extent of the selected range within the wide-angle FOV of the display 100. In other words, the processor 306 retrieves terrain information projected along the current real-time heading of the host aircraft within the vertical, lateral and range extents of the displayed FOV.

The processor 306 operates machine instructions for determining tactical and strategic terrain as a function of the terrain information relevant to the real-time spatial position, heading, optional track and acceleration, altitude above ground, and the pre-selected strategic threshold altitude, below which the terrain is categorized as strategic. The strategic terrain information is coded according to a monochromatic scale that is graduated as a function of terrain elevation relative to MSL to develop a three-dimensional (3-D) representation of the terrain relief, as discussed herein.

Tactical terrain above the pre-selected strategic threshold altitude is categorized as a function of the potential hazards presented. The tactical terrain divided into "warning," "caution," and "all clear" bands as a function of the terrain elevation relative to the aircraft's current altitude above ground. As discussed herein, the tactical terrain information is color coded relative to the aircraft's current altitude above ground based upon the pre-selected "warning," "caution," and "all clear" relative elevation thresholds. Each elevation band being coded on a graduated scale as a function of terrain elevation to develop a three-dimensional (3-D) representation of the terrain relief, as discussed herein.

Optionally, the processor 306 operates additional machine instructions for generating the grid lines 126 (shown in FIG. 2) following the terrain contours, which, if present, are displayed using a lighter shade of the color used to represent the terrain. Alternatively, randomized texture is displayed in lieu of grid lines 126.

The processor 306 then operates additional machine instructions for generating display control signals that are applied to the display generator 322 to generate a plurality of display control signals that result in the updated terrain situational awareness information being displayed on the cockpit display 100 in real-time.

The processor 306 further operates the machine instructions to update the strategic and tactical terrain information, including the coding thereof, in real-time using the real-time spatial position and heading signals received from the data bus 302 to retrieve terrain information relevant to the aircraft's current spatial position, heading and altitude. The processor 306 then generates display control signals that are applied to the display generator 322 to generate a plurality of display control signals that result in the updated terrain situational awareness information being displayed on the cockpit display 100 in real-time.

The integrated display presentation system 300 as embodied in FIG. 3 includes a plurality of machine instructions stored in the onboard memory 304, which are retrieved and operated by a processor 306 to generate the terrain awareness information of the invention on the display 100 using conformal symbology, whereby outside relationships are replicated on the display 100 inside the aircraft. The simulated terrain information is alternatively rendered on the display 100 using true one-to-one mapping or a compressed mapping that maximizes the amount of information presented on the display. The integrated display presentation system 300 thus presents terrain information using symbology that substantially mimics the form of the terrain as it appears in the far domain. In other words, the terrain information is presented in a format consistent with a view of the actual terrain as seen from the cockpit. The conformal symbology permits the pilot to utilize pre-attentive referencing rather than conscious decision, thereby reducing pilot workload.

U.S. Pat. No. 5,745,863, THREE DIMENSIONAL LATERAL DISPLACEMENT DISPLAY SYMBOLOGY WHICH IS CONFORMAL TO THE EARTH, which is incorporated herein by reference, illustrates well-known means for computing and implementing symbology conformal with the earth's surface. Those skilled in the art can readily adapt these calculations or use substantially similar calculations, including embodiments using satellite position and altitude systems such as the global positioning system (GPS) and the like, for computing and implementing the terrain awareness information of the present invention using conformal symbology. These calculations are straight forward using basic trigonometry, as disclosed in U.S. Pat. No. 5,745,863.

Accordingly, those of ordinary skill in the art can use generally well-known calculations adapted from or substantially similar to the calculations disclosed by U.S. Pat. No. 5,745,863 in combination with known aircraft position and altitude information (retrieved from onboard instruments) and known terrain position and altitude information (retrieved from a database) to compute and implement terrain symbology conformal with the earth's surface as it would appear from the cockpit if visible.

Figure 4:
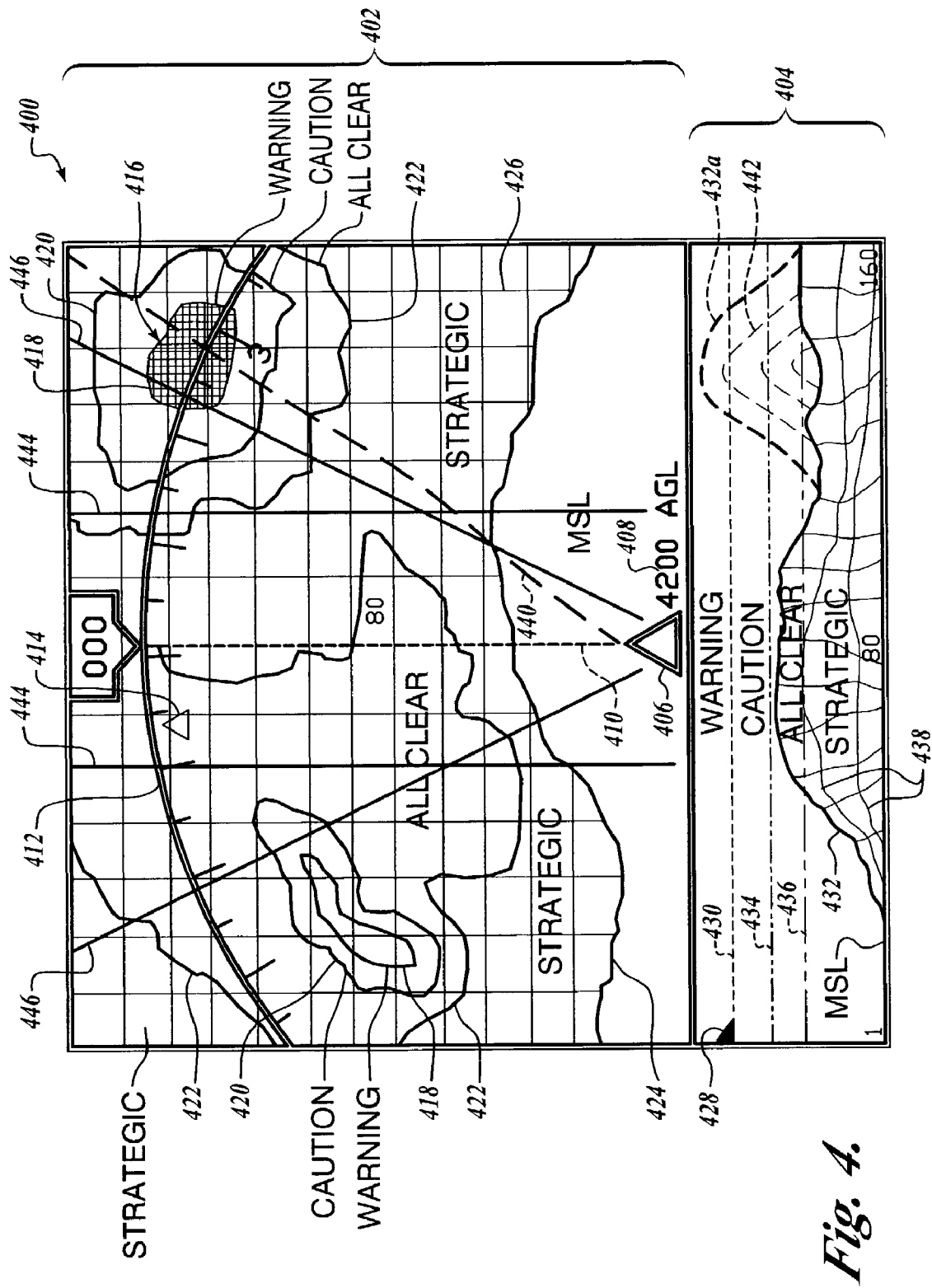
FIG. 4 illustrates, by example and without limitation, the method of the invention for dynamically displaying terrain situation awareness information over a selected distance relative to an aircraft's current position and altitude as embodied in an alternative terrain situational awareness display presented on an alternative graphical cockpit display apparatus presenting the terrain situational awareness information of the invention in one or both of a horizontal or plan terrain elevation view and a profile terrain elevation view.

FIG. 4 illustrates alternative embodiments of the invention wherein the terrain information is presented relative to a the host aircraft's position, altitude and one or both of the heading and track on a cockpit display 400 as both a horizontal or plan terrain elevation view and a profile terrain elevation view, as described by Wichgers, et al. in above incorporated U.S. Pat. No. 5,936,552, INTEGRATED HORIZONTAL AND PROFILE TERRAIN DISPLAY FOMAT FOR SITUATIONAL AWARENESS. The display 400 is illustrated in FIG. 4, by example and without limitation, formatted to display both a horizontal terrain elevation view 402 and a profile terrain elevation view 404, both having a selectable display format scaling.

Scale of the display 400 is indicated by numerals thereon. For example, when the scale of display is a total of 160 miles ahead of the aircraft, represented by triangle icon 406, to the top of the screen, the numeral "80" is shown in the center of horizontal elevation view 402 to indicate the midpoint. The numerals "1," "80," and "160" similarly show the scale at the bottom of profile view 404. The display format scaling is selectable similar to weather radar display scale selections, or is continuously selectable.

The horizontal elevation view 402 uses a triangle icon 406 to indicate the host aircraft's current position. Current altitude 408 is shown beside the triangle icon 406. Current aircraft heading is indicated by the vertical dashed line 410 extending from triangle icon 406 to a compass rose 412 and the selected aircraft heading is indicated by the triangular heading bug 414 on the compass rose 412.

The horizontal elevation view 402 displays elevation data for the region ahead and around the aircraft, the terrain elevation data is supplied by a database as a function of current aircraft position and altitude AGL. Terrain elevations are displayed following the convention as described herein. Accordingly, tactical terrain includes the warning, caution and all clear color coding relative to aircraft altitude, while strategic terrain has the monochromatic color coding absolute relative to MSL. Terrain elevations within the pre-selected tactical and strategic bands or zones relative to the current aircraft altitude are depicted by illuminating corresponding pixels of the display. See, for example, region 416 of display 400.

The terrain situational awareness information of the invention is displayed over the selected distance relative to the host aircraft's current position and altitude.

Tactical terrain is terrain having an elevation greater than a pre-selected strategic threshold altitude relative to the aircraft's current altitude AGL. Tactical terrain information is color coded (colors not shown) as "warning," "caution," or "all clear" as a function of elevation relative to the aircraft's current altitude AGL. As describe herein, pixels representing tactical terrain that is at or above the aircraft's current altitude, as indicated by contour line 418, are illuminated or "painted" using a relative altitude color selected to indicate warning, such as red.

Pixels representing terrain having an elevation below the current altitude of the aircraft, as indicated by contour line 418, but above the pre-selected "caution" threshold altitude relative to the aircraft's current altitude, as indicated by contour line 420, are illuminated using a relative altitude color selected to indicate caution, such as yellow.

Pixels representing terrain having an elevation below the pre-selected "caution" threshold altitude relative to the aircraft's current altitude, as indicated by contour line 420, but above a pre-selected "all clear" or strategic threshold altitude, as indicated by contour line 422, are illuminated using a relative altitude color selected to indicate all clear or safety, such as green.

The tactical terrain information is superimposed over monochromatic strategic terrain information. Strategic terrain is terrain having an elevation at or below the pre-selected "all clear" or strategic threshold altitude, as indicated by the contour line 422, but above MSL, as indicated by contour line 424 at the shoreline.

Pixels representing strategic terrain information are color coded (color not shown) using a relative altitude color selected to indicate neutrality in a graduated scale as a function of terrain elevation relative to mean sea level.

Accordingly, pixels representing the strategic terrain information are illuminated using a graduated scale from a darkest shade or maximum opacity to a lightest shade or maximum transparency over the minimum to maximum elevation of the terrain data for the current displayed range of data.

The tactical and strategic terrain information presented on display 400 may also include topographical relief information illustrated as grid lines 426 following the terrain contour. If present, the grid lines 426 are displayed using a lighter shade of the color used to represent the contoured portion of terrain. For example, the grid lines 126 are painted at about 80 percent transparency and spaced about 180 meters apart with a North-South orientation.

The profile situational awareness information display portion 404 of the display 400 indicates the aircraft present position using triangle symbol 428. Horizontal dashed line 430 represents current aircraft altitude AGL and is useful for determining terrain clearance. Terrain profile 432 depicts the vertical terrain elevation profile of either the path directly in front of the aircraft or along the aircraft's programmed path as supplied by the FMS as supplied by the database of terrain elevation data as a function of current aircraft position and altitude and, optionally, track. The terrain profile 432 of the profile display 404 depicts a section view or "slice" of terrain elevation information taken along the aircraft heading, as indicated by vertical dashed line 410 of the horizontal elevation view 402.

The display 404 is color coded (colors not shown) according to terrain elevations relative to the aircraft. For example, the colors red, yellow, and green are used to indicate warning, caution, and all clear, respectively. Accordingly, horizontal elevation view 12 are shown using the color red (not shown), indicating warning, to display all terrain elevations which are higher than the host aircraft's current altitude.

The same terrain information color scheme (not shown) used in the horizontal or plan terrain elevation view 402 is used in profile view 404 to display all portions of the flight profile 432 as a function of the current altitude, as indicated by dashed line 430. Terrain at or above the current altitude line 430 is therefore painted the selected relative altitude warning color, e.g., red.

The current altitude line 430 also marks the top of the pre-selected caution elevation band. The caution elevation line 434 marks the "caution" threshold altitude at the pre-selected distance below the aircraft's current altitude. Terrain between the warning elevation line 432 and the bottom of the caution band at the caution elevation line 434 is painted the selected relative altitude caution color, e.g., yellow.

Terrain in the "all clear" or safety band below the caution elevation line 434 but above a strategic elevation line 436 is terrain below the selected caution elevation and is not currently a hazard to the aircraft, but is still tactical terrain that represents a potential threat. Terrain information within the all clear or safety band below the caution elevation line 434 but above the strategic elevation line 436 is painted the "all clear" or safety relative altitude color, e.g., green.

Terrain above MSL at the sea shore 424 but below the minimum tactical elevation, which is represented by the strategic elevation line 436, is painted the selected color for strategic terrain, e.g., brown. However, unlike prior art terrain situational awareness display systems that are limited to displaying only tactical information, the strategic terrain information is coded as a function of the current aircraft altitude. The strategic terrain data is coded from lowest to highest elevation, with the lowest elevation being painted a darkest or most saturated shade, the highest elevation below strategic elevation line 436 being painted a lightest or least saturated shade, and different elevations in between being shaded on a graduated color saturation scale between the dark and light shades of the lowest and highest elevations. Shading within the monochromatic scale being graduated as a function of elevation above MSL.

Optionally, the strategic terrain information is further coded with topographical relief information presented on the profile terrain elevation view 404 of display 400 as grid lines 438 following the terrain contour. If present, the grid lines 438 are displayed using a lighter or more transparent shade of the color used to represent the contoured portion of terrain. For example, the grid lines 438 are painted at about 80 percent transparency and spaced about 180 miles apart with a North-South orientation.

Furthermore, the terrain awareness information coding according to the invention is dynamically updated as a function of the host aircraft's current altitude AGL to provide a continuous, substantially real-time terrain situational awareness display, as discussed herein. As such, terrain information is color coded either tactical or strategic as a function of the aircraft's current altitude; the relative altitude color coding changing with decreasing and increasing altitude of the host aircraft. The warning, caution, all clear and strategic coding elevations or bands thus also change as the aircraft's altitude changes. Thus, as the aircraft ascends, warning, caution, all clear and strategic coding elevations increase accordingly. When the aircraft descends, the warning, caution, all clear and strategic coding elevations decrease accordingly.

Accordingly, the host aircraft changes to a track indicated by the dashed line 440 extending from triangle icon 406 through the mountain represented by the terrain elevation contour lines 422, 420, 418 (shown in the horizontal terrain elevation view 402). The new track passes through the terrain elevations within the pre-selected tactical warning band or zone relative to the current aircraft altitude, as depicted by illuminated corresponding pixels 416 of the display representing a mountain peak. In the profile terrain elevation view 404, terrain profile 432, depicting the vertical terrain elevation profile of the path directly in front of the aircraft as supplied by the database of terrain elevation data as a function of current aircraft position and altitude, changes to terrain profile 432a having terrain elevations in the "caution" and "warning" bands, as indicated by the horizontal lines 434 and 430 passing through. The horizontal dashed line 430 representing the current aircraft altitude AGL passes through the terrain and indicates that the aircraft lacks terrain clearance given the current heading and aircraft altitude AGL.

Optionally, contour grid lines 442 are applied to the horizontal terrain elevation view 402 as a function of the terrain following the terrain contour to provide additional strategic terrain awareness information.

Alternatively, the cockpit display 400 presents one the other of the horizontal terrain elevation view 402 profile terrain elevation view 404.

According to another embodiment of the invention, the tactical terrain in the horizontal terrain elevation view 402 is coded relative to flight path projection in combination with the current altitude above the terrain. For example, if the terrain is above the aircraft's current altitude but it is outside of either a pre-selected envelope represented by parallel lines 444 or angular lines 446 on either side of the aircraft heading 410, the terrain is painted using the strategic coloring. Thus, when the flight path is not projected to go into an area, the terrain remains the strategic color, e.g., brown, and is not painted one of the tactical colors, e.g., green or yellow or red. Rather, terrain outside of the pre-selected envelope around the projected flight path is painted the strategic color.

The flight path is projected along the direction of the aircraft's programmed or intended route as supplied by the FMS. The pre-selected envelope represented by parallel lines 444 or angular lines 446 on either side of the aircraft position 406 represents a volume of space surrounding the projected one of the aircraft heading 410 and the aircraft track 440 for a pre-selected distance from the updated position. The pre-selected envelope represented by parallel lines 444 is a vertically extending rectangular-shaped volume of space surrounding the projected one of the aircraft heading and the aircraft track.

The pre-selected envelope represented by angular lines 446 is a vertically extending angular wedge-shaped volume of space surrounding the projected one of the aircraft heading and the aircraft track. The vertically extending angular wedge-shaped volume of space that forms the envelope includes a volume of space within an area swept by a vertical plane between pre-selected positive and negative azimuth angles relative to the projected one of the aircraft heading and the aircraft track and has an apex located by example and without limitation approximately at the at updated position.

The flight path is projected as a time function so that terrain is depicted according to the tactical colors of the invention for a distance calculated as a time window of five minutes or another selected time window. Optionally, the time window is variable as a function of current air speed. Alternatively, the flight path is projected for a pre-selected distance that may be varied as a function of current air speed.

The predictive algorithm is further variable based upon the accuracy and resolution of terrain database, performance characteristics of aircraft, desired protection window, RNP (required navigation performance), and other factors. In essence, only terrain in front of the aircraft or in the direction of turn may give rise to any "warning," "caution," or "all clear" signal.

The profile terrain elevation view 404 is not affected.

Computer Program Product

In addition to being practiced as apparatus and methods, the present invention is also practiced as a computer program product for generating and dynamically displaying the integrated terrain situational awareness information of the invention, including the conformal symbology, on the cockpit displays 100, 400 shown in FIGS. 2 and 4, or another suitable cockpit display device.

The computer program product of the invention includes a computer-readable storage medium having executable computer-readable program code means embodied in the medium. With reference to FIG. 3, the computer-readable storage medium may be part of the memory device 304, and the processor 306 of the present invention implements the executable computer-readable program code means for receiving sources of instrument signals reporting flight parameter information and generating a plurality of display control signals informing the terrain situational awareness information presentation of the invention, optionally according to a conformal format, as described herein.

The executable computer-readable program code means includes: for example, a first executable computer-readable program code means for receiving one or more instrument signals reporting the host aircraft's current position information, one or both of current heading and track information, and current altitude AGL information; a second executable computer-readable program code means for accessing a database of terrain elevation information and retrieving relevant terrain elevation data as a function of the host aircraft's current position information, one or both of current heading and track information, and current altitude AGL information, wherein the relevant terrain elevation data includes terrain elevation data occurring within a selected range of the host aircraft's current position and having an elevation extending from a minimum elevation to a maximum elevation; a third executable computer-readable program code means for categorizing the retrieved terrain elevation data into a plurality of different elevation bands that are differentiated at different pre-selected elevation levels relative to the host aircraft's current altitude AGL information, wherein the different elevation bands are: a first "warning" elevation band of terrain data extends upwardly from the host aircraft's current altitude AGL and encompasses all the retrieved terrain elevation data having an elevation the same as or greater than the host aircraft's current altitude AGL, a second "caution" elevation band of terrain data extends downwardly from the host aircraft's current altitude AGL to a pre-selected "caution" or safety elevation lower than the host aircraft's current altitude AGL and encompasses all the retrieved terrain elevation data having an elevation between the host aircraft's current altitude AGL and the pre-selected "caution" elevation, a third "all clear" or safety elevation band of terrain data extends downwardly from the pre-selected "caution" elevation to a pre-selected "all clear" or safety elevation lower than both the host aircraft's current altitude AGL and the "caution" elevation and encompasses all the retrieved terrain elevation data having an elevation between the pre-selected "caution" elevation and the pre-selected "all clear" or safety elevation, and a fourth "strategic" elevation band of terrain data extends downwardly from the pre-selected "all clear" elevation to the minimum terrain elevation within the retrieved terrain elevation data and encompasses all the retrieved terrain elevation data having an elevation between the pre-selected "all clear" elevation and the minimum terrain elevation within the retrieved terrain elevation data; a fourth executable computer-readable program code means for applying different relative altitude color coding to the terrain elevation data in each of the different bands, the fourth computer-readable program code means including executable computer-readable program code means for applying a color scale graduated as a function of elevation to at least the retrieved terrain elevation data within the fourth "strategic" elevation band of terrain data, the color scale applied to the terrain elevation data being graduated as a function of elevation between a most saturated or darkest shade for the terrain elevation data having the minimum or lowest elevation relative to mean sea level (MSL) to a least saturated or lightest shade for the terrain elevation data having the maximum or highest elevation at or below the pre-selected "all clear" elevation, if present in sufficient area marine, i.e., water, terrain features are coded a pre-cognitive color such as blue; a fifth executable computer-readable program code means for generating a plurality of display control signals for informing a terrain situation awareness display presentation according to the invention; and a sixth executable computer-readable program code means for outputting to a color graphics display the display control signals generated by the fifth computer-readable program code means.

Additionally, the fourth executable computer-readable program code means optionally includes executable computer-readable program code means for applying a color scale graduated as a function of elevation to the retrieved terrain elevation data within one or more of the first "warning" elevation band of terrain data, the second "caution" elevation band of terrain data, and the third "all clear" or safety elevation band of terrain data, the relative altitude color being coded between a most saturated or darkest shade for the terrain elevation data having the minimum or lowest elevation within the band to a least saturated or lightest shade for the terrain elevation data having the maximum or highest elevation within the band.

According to one embodiment of the invention, the third executable computer-readable program code means for categorizing the retrieved terrain elevation data into a plurality of different elevation bands further includes executable computer-readable program code means for determining that a portion of the retrieved terrain elevation data represents a body of water, and the fourth executable computer-readable program code means further includes executable computer-readable program code means for applying a relative altitude color representative of water. Optionally, the third and fourth executable computer-readable program code means for categorizing and coding the retrieved terrain elevation data as water are applied only to water having an elevation at MSL.

According to one embodiment of the invention, the database of terrain elevation information includes a plurality of hazard and obstacle information, such as man-made obstacle data, airport location data, docking location data, restricted airspace boundary data, particular airspace restricted elevation data, and other useful hazard and obstacle data; the second executable computer-readable program code means for accessing a database of terrain elevation information and retrieving relevant terrain elevation data as a function of the host aircraft's current position and altitude AGL information further includes executable computer-readable program code means for accessing and retrieving a relevant portion of the plurality of hazard and obstacle information occurring within the selected range of the host aircraft's current position; and the computer-readable program code means further includes a seventh executable computer-readable program code means for coding one or more of the plurality of the relevant hazard and obstacle information using one or more colors different from the relative altitude color coding applied to the terrain elevation data in the different elevation bands or symbology for indicating the relevant hazard and obstacle database information on the display.

According to one embodiment of the invention, the database of terrain elevation information includes topographical relief information useful for applying the grid lines 126 following the terrain contour, the second executable computer-readable program code means for accessing a database of terrain elevation information and retrieving relevant terrain elevation data as a function of the host aircraft's current position and altitude AGL information further includes executable computer-readable program code means for accessing and retrieving a relevant portion of the topographical relief information occurring within the selected range of the host aircraft's current position; and the computer-readable program code means further includes eighth executable computer-readable program code means for applying a plurality of spaced-apart grid lines 126 as a function of the retrieved topographical relief information, the seventh executable computer-readable program code means for applying the grid lines 126 with a pre-selected compass orientation, such as a North-South orientation, following the terrain contour and the relative altitude color along the grid lines 126 being coded a minimum saturation or shade less than the least saturated or lightest shade of the terrain elevation data.

The executable computer-readable program code means is operated continuously to provide a dynamic, substantially real-time output of the display control signals generated by the fifth computer-readable program code means to the color graphics display 100.

According to one embodiment of the invention, the fifth executable computer-readable program code means for generating a plurality of display control signals for informing a terrain situational awareness display presentation according to the invention further includes executable computer-readable program code means for generating the display control signals according to the wide-angle, look-ahead format depicted in FIG. 2.

According to one alternative embodiment of the invention, the fifth executable computer-readable program code means for generating a plurality of display control signals for informing a terrain situational awareness display presentation according to the invention further includes executable computer-readable program code means for generating the display control signals relative to a the host aircraft's position according to either one of the horizontal terrain elevation view 402 or the profile terrain elevation view 404 formats depicted in FIG. 4.

According to another alternative embodiment of the invention, the fifth executable computer-readable program code means for generating a plurality of display control signals for informing a terrain situational awareness display presentation according to the invention further includes executable computer-readable program code means for generating the display control signals having the terrain situational awareness information of the invention formatted as:

a horizontal terrain elevation view wherein the horizontal terrain elevation view is a display of terrain elevation relative to a host aircraft's position and altitude; and a profile terrain elevation view wherein the profile terrain elevation view is a display of vertical terrain profile in a line from directly in front of the vehicle out to a selected distance.

Optionally, the computer-readable program code means further includes a ninth executable computer-readable program code means is included for accessing aircraft's current position information, one or both of current heading and track information, and current altitude AGL information, and projecting one of the aircraft heading and the aircraft track extending a pre-selected distance ahead of the aircraft's current position. The display control signals are generated by the fifth executable computer-readable program code means as having the terrain situation awareness information of the invention formatted as a horizontal terrain elevation view, as illustrated in FIG. 4. Thus, the fifth executable computer-readable program code means format the horizontal terrain elevation view as a display of terrain elevation having the terrain coded according to the strategic coloring scheme of the invention only within a pre-selected envelope projected a pre-selected distance along one of a host aircraft's current heading and current track relative to the host aircraft's position and altitude.

Alternatively the display control signals are generated by the fifth executable computer-readable program code means as having the terrain situational awareness information of the invention formatted as a wide-angle, look-ahead perspective or conformal view, as illustrated in FIG. 2. Accordingly, the fifth executable computer-readable program code means format the wide-angle, look-ahead perspective or conformal view of FIG. 2, with the strategic coloring scheme of the invention applied only within pre-selected envelope projected a pre-selected distance along one of a host aircraft's current heading and current track relative to the host aircraft's position and altitude.

The fifth executable computer-readable program code means format the envelope to include a volume of space surrounding the projected one of the aircraft heading and the aircraft track for a pre-selected distance from the updated position. According to one embodiment, the envelope includes a vertically extending angular wedge-shaped volume of space surrounding the projected one of the aircraft heading and the aircraft track the vertically extending angular wedge-shaped volume of space. The vertically extending angular wedge-shaped volume of space is by example and without limitation a volume of space within an area swept by a vertical plane between pre-selected positive and negative azimuth angles relative to the projected one of the aircraft heading and the aircraft track and having an apex located approximately at the aircraft's updated position.

While the preferred embodiment of the invention has been illustrated and described, it will be appreciated that various changes can be made therein without departing from the spirit and scope of the invention.

What is claimed is:

1. A display control device, comprising:
   means for receiving at intervals one or more signals representative of position, at least one of heading and track data, and altitude above ground data; and
   means for generating on a display device a presentation representative of a strategic portion of terrain elevation data occurring within a selected range of the position data relative to at least one of the heading and the track data and extending between a minimum elevation of terrain elevation information within the selected range and a pre-selected strategic altitude threshold less than the altitude above ground data, the display presentation generating means further comprising means for formatting the strategic terrain elevation data in a monochromatic scale graduated as a function of terrain elevation.

2. The display control device of claim 1 wherein the strategic terrain elevation data display presentation generating means further comprises means for formatting the strategic terrain elevation data relative to mean sea level.

3. The display control device of claim 1, further comprising means for generating on a display device a presentation representative of a tactical portion of the terrain elevation data occurring within the selected range of the position data relative to at least one of the heading and the track data and extending upwardly from the pre-selected strategic altitude threshold, the tactical terrain elevation data display presentation generating means further comprising means for formatting the tactical terrain elevation data in a different color as a function of terrain elevation.

4. The display control device of claim 3 wherein the means for formatting the tactical terrain elevation data further comprises:
   means for formatting in a first color a first portion of the tactical terrain elevation data occurring above the altitude above ground,
   means for formatting in a second color a second portion of the tactical terrain elevation data occurring above the tactical terrain elevation data and an elevation below the altitude above ground, and
   means for formatting in a third color a third portion of the tactical terrain elevation data occurring above the second portion of the tactical terrain elevation data and below the first portion of the tactical terrain elevation data.

5. The display control device of claim 4, further comprising means for displaying the presentation representative of the strategic portion of terrain elevation data and the presentations representative of each of the tactical portion of the tactical terrain elevation data.

6. A display control device comprising:
   a processor structured for receiving terrain elevation information and samples of current position and altitude above ground data; and
   one or more algorithms resident on the processor for generating, as a function of the current position and altitude above ground data, one or more display control signals for causing a display device to display, in a monochromatic scale graduated as a function of terrain elevation relative to mean sea level, a strategic portion of the terrain elevation information extending between a minimum elevation of the strategic portion of the terrain elevation information and a pre-selected strategic altitude threshold less than the altitude above ground data.

7. The display control device of claim 6 wherein:
   the processor is further structured for receiving samples of at least one of current heading data and current track data; and
   the one or more algorithms resident on the processor for generating one or more display control signals for causing a display device to display a strategic portion of the terrain elevation information are further operated for generating the one or more display control signals as a function of the current position, altitude above ground and heading data.

8. The display control device of claim 6 wherein the one or more algorithms resident on the processor for generating the one or more display control signals further comprise one or more algorithms for continuously generating the one or more display control signals as a function of continuously updated current position and altitude above ground data.

9. The display control device of claim 6 wherein the one or more algorithms resident on the processor for generating the one or more display control signals further comprise one or more algorithms for causing a display device to display a tactical portion of the terrain elevation information having an elevation greater than the pre-selected strategic altitude threshold in a format color coded as a function of terrain elevation relative to the current altitude above ground information.

10. The display control device of claim 6 wherein the one or more algorithms for causing a display device to display a tactical portion of the terrain elevation information in a format color coded as a function of terrain elevation relative to the current altitude above ground information further comprise one or more algorithms for causing a display device to display a portion of the tactical terrain elevation information having an elevation greater than the current altitude above ground in a format color coded in a relative altitude color selected to indicate warning.

11. The display control device of claim 10 wherein the one or more algorithms for causing a display device to display a tactical portion of the terrain elevation information in a format color coded as a function of terrain elevation relative to the current altitude above ground information further comprise one or more algorithms for causing a display device to display one or more of:
   a safe portion of the tactical terrain elevation information having an elevation greater than the pre-selected strategic altitude threshold but less than the current altitude above ground in a format color coded in a relative altitude color selected to indicate safety, and
   a caution portion of the tactical terrain elevation information having an elevation greater than the safe portion of the tactical terrain elevation but less than the current altitude above ground in a format color coded in a relative altitude color selected to indicate caution.

12. An integrated display apparatus, comprising:
   a source of real-time electronic data signals reporting current position and altitude above ground information;
   a database digital of terrain elevation information stored as a function of elevation; and
   a memory having a plurality of machine instructions sorted therein, the machine instructions being executable by a processor for causing a display device to display a plurality of the terrain elevation information as a function of the current position and altitude above ground information;
   a processor coupled to receive the electronic data signals, coupled to the database for retrieving the terrain elevation information and coupled to the memory for retrieving the machine instructions, the processor being structured to operate the machine instructions for generating a terrain situational awareness information presentation, wherein:
   (a) a strategic portion of the terrain elevation information having an elevation less than a pre-selected tactical altitude threshold relative to the current altitude above ground information is generated being color coded according to a monochromatic scale graduated as a function of terrain elevation relative to mean sea level, and
   (b) a tactical portion of the terrain elevation information having an elevation greater than the pre-selected tactical altitude threshold is generated being color coded as a function of terrain elevation relative to the current altitude above ground information; and
   a cockpit display being coupled to receive and display the terrain situational awareness information presentations.

13. The integrated display apparatus of claim 12 wherein the machine instructions executable by a processor for causing a display device to display the tactical portion of the terrain elevation information further comprise machine instructions executable by a processor for causing a display device to display:
   a first portion of the tactical portion of the terrain elevation information having an elevation greater than the current altitude above ground generated being color coded a first relative altitude color selected to indicate warning,
   a second portion of the tactical portion of the terrain elevation information having an elevation less than the current altitude above ground and greater than a pre-selected caution altitude threshold approximately midway between the pre-selected tactical altitude threshold and the current altitude above ground generated being a color coded a second relative altitude color selected to indicate caution, and
   a third portion of the tactical portion of the terrain elevation information having an elevation less than the pre-selected caution altitude threshold and greater than pre-selected tactical altitude threshold generated being color coded a third relative altitude color selected to indicate safety.

14. The integrated display apparatus of claim 12 wherein the source of real-time electronic data signals reporting current position and altitude above ground information further comprises real-time electronic data signals reporting one of current heading and track information.

15. The integrated display apparatus of claim 14 wherein the cockpit display being coupled to receive and display the terrain situational awareness information presentations further comprises a display presenting a look-ahead perspective view.

16. The integrated display apparatus of claim 14 wherein the cockpit display being coupled to receive and display the terrain situational awareness information presentations further comprises a display presenting one of:
   a horizontal terrain elevation view wherein the horizontal terrain elevation view is a display of terrain elevation relative to the current position and altitude above ground information; and
   a profile terrain elevation view wherein the profile terrain elevation view is a display of vertical terrain profile in a line from the current position to a selected distance along one of the current track and a projected aircraft path.

17. The integrated display apparatus of claim 14 wherein the cockpit display being coupled to receive and display the terrain situational awareness information presentations further comprises a display presenting both of:
   a horizontal terrain elevation view wherein the horizontal terrain elevation view is a display of terrain elevation relative to the current position and altitude above ground information; and
   a profile terrain elevation view wherein the profile terrain elevation view is a display of vertical terrain profile in a line from the current position to a selected distance along one of the current heading, the current track, and a projected current aircraft path.

18. A computer program residing on a computer usable storage medium, the computer program comprising:
   executable computer-readable program code means for receiving at intervals one or more signals representative of updated position and altitude above ground data; and
   executable computer-readable program code means for generating and outputting a plurality of display control signals representative of a strategic portion of terrain elevation data occurring within a pre-selected range of the position data and extending between a minimum elevation of terrain elevation information and a pre-selected strategic altitude threshold less than the altitude above ground data, the strategic portion of terrain elevation data being formatted in a monochromatic scale graduated as a function of terrain elevation relative to mean sea level.

19. The computer program of claim 18 wherein:
the cxecutable computer-readable program code means for receiving at intervals one or more signals representative of updated position and altitude above ground data further comprises executable computer-readable program code means for receiving at intervals one or more signals representative of one of updated heading data and updated track data; and
the strategic portion of the terrain elevation data further comprises terrain elevation data occurring within a pre-selected range of the position data relative to one of the heading and track data.

20. The computer program of claim 18, further comprising executable computer-readable program code means for generating and outputting a plurality of display control signals representative of tactical terrain elevation data occurring within a pre-selected range of the position data and extending between the altitude above ground data and the pre-selected strategic altitude threshold, the tactical terrain elevation data being divided into a plurality of different tactical terrain elevation data as a function of elevation relative to the altitude above ground data, a first of the different tactical terrain elevation data having an elevation greater than the altitude above ground data, and a second of the different tactical terrain elevation data having an elevation greater than the pre-selected strategic altitude threshold and less than the altitude above ground data.

21. The computer program of claim 20 wherein the second of the different tactical terrain elevation data further comprises second and third different tactical terrain elevation data, the second of the different tactical terrain elevation data extending between an elevation greater than the pre-selected strategic altitude threshold and the altitude above ground data, and the third of the different tactical terrain elevation data extending between the second of the different tactical terrain elevation data and the altitude above ground data.

22. The computer program of claim 21 wherein the executable computer-readable program code means for receiving at intervals one or more signals representative of updated position and altitude above ground data further comprises executable computer-readable program code means for receiving at intervals one or more signals representative of updated heading data; and
the tactical portion of the terrain elevation data further comprises terrain elevation data occurring within a pre-selected range of the position data relative to one of the heading and track data.

23. The computer program of claim 18 wherein the plurality of display control signals generated and output by the executable computer-readable program code means for generating and outputting a plurality of display control signals further comprises a plurality of display control signals for generating a look-ahead perspective view.

24. A computer program product, comprising:
a computer-usable medium having computer-readable code embodied therein for configuring a computer processor, the computer program product comprising:
a first executable computer-readable code configured to cause a computer processor to receive at intervals samples of one or more instrument signals reporting substantially continuously updated position data, updated altitude above ground data, and at least one of updated heading and tracking data;
a second executable computer-readable program code configured to cause a computer processor to access at intervals a database of terrain elevation data and retrieve relevant terrain elevation data as a function of the updated position data, updated altitude above ground data, and one of updated heading and track data, wherein the relevant terrain elevation data include terrain elevation data occurring within a selected range of the updated position along one of the updated heading and track and having an elevation extending from a minimum of the database of terrain elevation data within the selected rage to a maximum of the database of terrain elevation data;
a third executable computer-readable program code configured to cause a computer processor to categorize the retrieved terrain elevation data into a plurality of different elevation bands tat are differentiated at different pre-selected elevation levels relative to the updated altitude AGL data, wherein the different elevation bands include:
a first tactical elevation band of terrain elevation data extending upwardly from a tactical elevation selected relative to the updated altitude AGL and encompassing a portion of the relevant terrain elevation data having an elevation the same as or greater than the selected tactical elevation, and
a second strategic elevation band of terrain data extending downwardly from the selected tactical elevation to the minimum of the database of terrain elevation data within the selected range; and
a fourth executable computer-readable program code configured to cause a computer processor to apply different relative altitude color coding to the terrain elevation data in each of the different bands, the fourth computer-readable program code including executable computer-readable program code configured to cause a computer processor to apply a color scale graduated as a function of elevation to at least the relevant terrain elevation data within the strategic elevation band of terrain data, the color scale being graduated as a function of elevation between a most saturated shade for the minimum of the database of terrain elevation relative to mean sea level and a least saturated shade for the terrain elevation data at the selected tactical elevation.

25. The computer program product of claim 24 wherein the third executable computer-readable program code configured to cause a computer processor to categorize the retrieved terrain elevation data into a plurality of different elevation bands further comprises executable computer-readable program code configured to cause a computer processor to categorize the first tactical elevation band of terrain elevation data into a plurality of different tactical elevation bands relative to the updated altitude AGL data, wherein the different tactical elevation bands include:
a "warning" elevation band of terrain data extending upwardly from the updated altitude AGL data,
a "caution" elevation band of terrain data extending downwardly from the updated altitude AGL data to a pre-selected safety elevation lower than the updated altitude AGL data but above the second strategic elevation band of terrain data, and a "safety" elevation band of terrain data extending downwardly from the pre-selected "caution" elevation to the second strategic elevation band of terrain data; and the fourth executable computer-readable program code configured to cause a computer processor to apply different relative altitude color coding to terrain elevation data in each of the different bands further comprises executable computer-readable program code configured to cause a computer processor to apply a different color to each of the different tactical elevation bands.

26. The computer program product of claim 24, further comprising a fifth executable computer-readable program code configured to cause a computer processor to generate a plurality of display control signals for informing a terrain situational awareness display presentation with the color coded terrain elevation data.

27. The computer program product of claim 26 wherein the fifth executable computer-readable program code further comprises executable computer-readable program code configured to cause a computer processor to generate a plurality of display control signals for informing a terrain situational awareness display presentation with the color coded terrain elevation data formatted to display a look-ahead perspective view.

28. The computer program product of claim 26, further comprising a sixth executable computer-readable program code configured to cause a computer processor to output the display control signals generated by the fifth computer-readable program code.

29. The computer program product of claim 26, further comprising:
a seventh executable computer-readable program code configured to cause a computer processor to access at intervals the updated position data, updated altitude above ground data, and one of updated heading and track data, and to project one of the aircraft heading and the aircraft track to a pre-selected distance ahead of the updated position data; and
wherein the display control signals generated by the fifth executable computer-readable program code is further configured to cause a computer processor to generate a plurality of display control signals for informing a terrain situational awareness display presentation with the color coded terrain elevation data within a pre-selected envelope corresponding to the projected one of the aircraft heading and the aircraft track.

30. The computer program product of claim 29 wherein the envelope further comprises a volume of space surrounding the projected one of the aircraft heading and the aircraft track for a pre-selected distance from the updated position.

31. The computer program product of claim 30 wherein the pre-selected distance further comprises a distance computed as a function of time.

32. The computer program product of claim 30 wherein the envelope further comprises a vertically extending angular wedge-shaped volume of space surrounding the projected one of the aircraft heading and the aircraft track.

33. The computer program product of claim 32 wherein the vertically extending angular wedge-shaped volume of space that comprises the envelope further comprises a volume of space within an area swept by a vertical plane between pre-selected positive and negative azimuth angles relative to the projected one of the aircraft heading and the aircraft track.

34. The computer program product of claim 32 wherein the vertically extending angular wedge-shaped volume of space that comprises the envelope further comprises an apex located approximately at the updated position.

35. A method for dynamically displaying terrain situational awareness information, the method comprising:
receiving at intervals one or more signals representative of position and altitude above ground data,
retrieving a plurality of terrain elevation data as a function of the position data; and
displaying a color coded representation of a strategic portion of the terrain elevation data having an elevation less than a pre-selected strategic altitude threshold determined as a function of the altitude data, including color coding the representation as a monochromatic scale graduated as a function of terrain elevation relative to mean sea level.

36. The method of claim 35 wherein receiving at intervals one or more signals representative of position and altitude above ground data further comprises receiving at intervals one or more signals representative of one of heading and track data.

37. The method of claim 36 wherein retrieving a plurality of terrain elevation data as a function of the position data further comprises retrieving the plurality of terrain elevation data as a function of the heading or track data.

38. The method of claim 35 further comprising displaying a color coded representation of a tactical portion of the terrain elevation data having an elevation greater than the pre-selected strategic altitude threshold.

39. The method of claim 38 wherein displaying a color coded representation of a tactical portion of the terrain elevation data further comprises color coding the representation the tactical portion of the terrain elevation data as a function of terrain elevation relative to the altitude above ground data.

40. The method of claim 39 wherein color coding the representation the tactical portion of the terrain elevation data as a function of terrain elevation relative to the altitude above ground data further comprises color coding in different colors a safe portion of the tactical terrain elevation data having an elevation between the strategic altitude threshold and a pre-selected caution elevation below the altitude above ground data, a caution portion of the tactical terrain elevation data having an elevation between the caution elevation and the altitude above ground data, and a warning portion of the tactical terrain elevation data having an elevation greater than the altitude above ground data.

* * * * *